Aug. 8, 1961 J. B. WHITTED 2,995,328
RETAINING DEVICE FOR AUTOMOTIVE WIRING
Filed Oct. 20, 1958
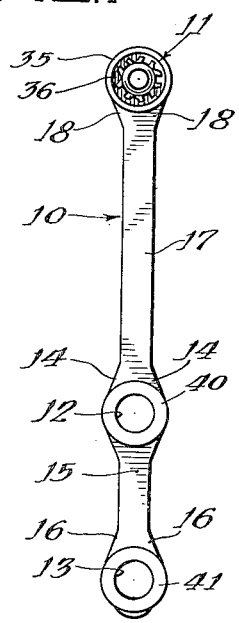
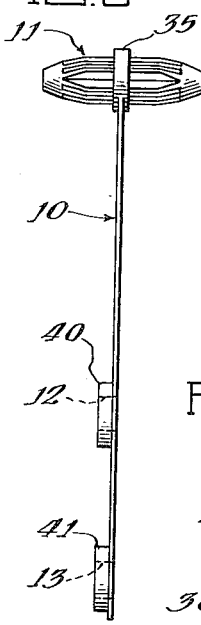
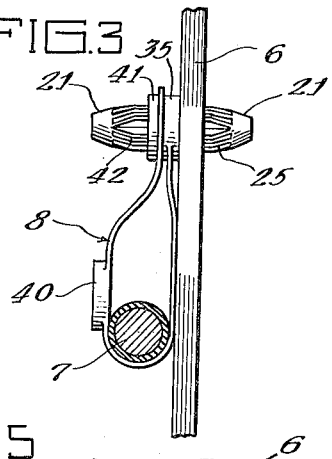
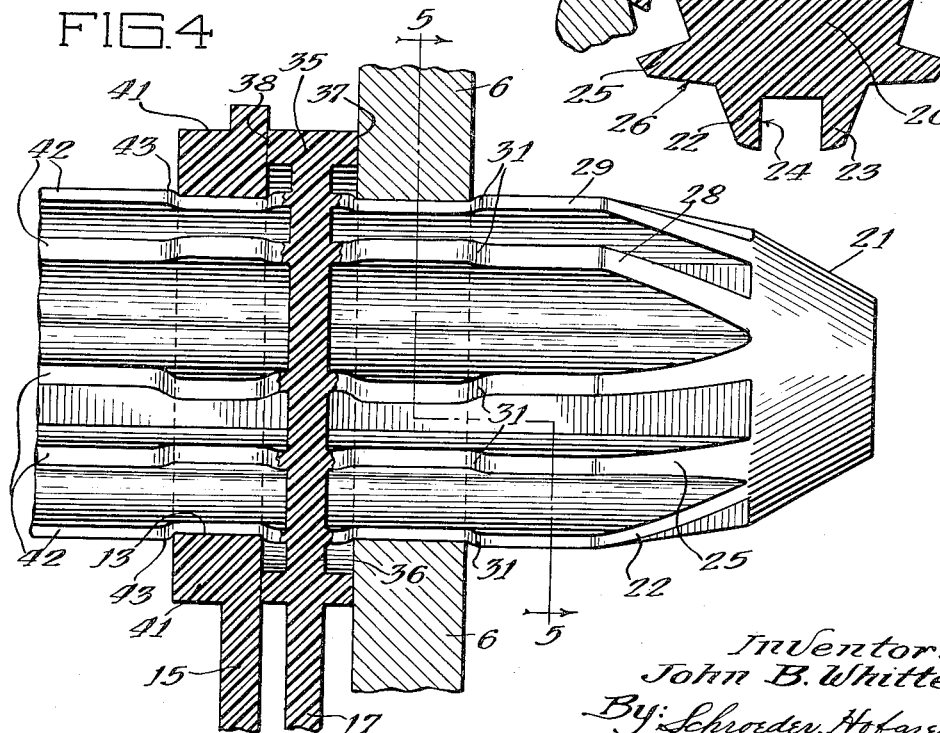
Inventor:
John B. Whitted
By: Schroeder, Hofgren,
Brady & Wegner
Attorneys

United States Patent Office 2,995,328
Patented Aug. 8, 1961

2,995,328
RETAINING DEVICE FOR AUTOMOTIVE WIRING
John B. Whitted, Kenilworth, Ill., assignor to Whitso, Inc., a corporation of Illinois
Filed Oct. 20, 1958, Ser. No. 768,383
2 Claims. (Cl. 248—71)

This invention relates to a one-piece plastic strap-like retainer for wires, cables and similar elongated members.

An illustrative use of the retainer of the present invention is in the engine compartment of an automobile wherein the strap-like retainer of this invention may be used to position and support electrical wiring, control cables and other lines relative to the sheet metal bulkheads, wheel covers and other parts defining the engine compartment. The many lines and wires within the engine compartment, in the trunk and throughout the vehicle as well, are generally held apart by sheet metal clips attached to a bulkhead, and the device of this invention is an improvement over the devices previously used. The present invention may be attached to the bulkhead simply by insertion of a post into an aperture in the bulkhead. The strap portion of the device may then be looped upon a wire or cable and secured in its looped shape to hold the wire or cable in place.

Plastic fasteners for the general purpose of the present structure but of different structure have been known and generally were deficient because of their difficulty of manufacture and their inability to use semi-rigid materials of relatively high strength and high heat resistance.

It is therefore the general object of this invention to provide a new and improved retainer for wires and the like.

Another object of this invention is to provide such a retainer having a solid post for securing the retainer to an apertured base.

Another object is to provide such a retainer having a particular structure permitting the molding of a retainer from plastic materials of a semi-rigid nature.

It is also an object of the invention to provide a structure permitting the molding thereof from plastic materials having a relatively high heat resistance.

A still further object is to provide such a structure which is reversible to an extent that no care need be exercized to properly orient the retainer relative to an apertured base.

Other objects, features and advantages of the present invention will be apparent from the following description of a preferred embodiment illustrated in the accompanying drawings in which:

FIGURE 1 is an elevational plan view of a retainer embodying the invention;

FIGURE 2 is a side elevational view of the device shown in FIGURE 1;

FIGURE 3 is an elevational view of the device as applied in use;

FIGURE 4 is an enlarged fragmentary sectional view through the attachment of the device to an apertured base, and FIGURE 5 is a transverse sectional view through FIGURE 4 taken substantially along line 5—5 therein.

The embodiment of the present invention chosen for purposes of illustration is a retainer satisfactory for holding wires and other cables against bulkheads within an engine compartment of an automobile or truck. In FIGURE 3, of the drawings, a sheet metal bulkhead 6 is shown with an electrical cable 7 secured within the loop 8 of the retainer of this invention which is, in turn, secured to the bulk head. Within an engine compartment, there are many wires which should be held against loose vibration or flopping about. The retainer of this invention is particularly adapted to quick insertion in apertures formed in the bulkheads and other sheet metal parts normally found in an engine compartment.

In the use of retainers of the present invention, there is a point in the assembly of the vehicles requiring the application of the retainers to the bulkheads in predetermined positions. The structure of the retainer is such that this may readily occur. Referring particularly to FIGURES 1 and 2, the retainer is a one-piece molded member having primarily two portions comprising a strap 10 and a post 11. The strap is relatively thin as shown in FIGURE 2 and has a wider dimension, as shown in FIGURE 1. The strap is equipped with a pair of apertures 12 and 13 at spaced locations. The strap is widened in the area 14 approaching the aperture 12, has a narrowed portion 15 between the two openings and is again widened in the areas 16 approaching the aperture 13, in turn at approximately the end of the strap. A relatively narrow portion 17 extends from the first opening 12 to the post 11. The strap is broadened slightly in the areas 18 connecting the strap to the post proper.

After the retainers are placed in position in a bulkhead of an automobile, they are sometimes required to withstand the heat of baking ovens for curing paint on the sheet metal parts of the vehicle. It is therefore desirable that the material from which the retainer is molded shall have a high heat resistance. It has been preferable, under these circumstances, to form the retainer from plastics of the nature of nylon. This material is particularly useful in the structure of the post since it is semi-rigid and gives the post a high strength, permitting it to retain itself in an apertured base against a considerable force seeking to remove it.

The construction of the post is best seen in FIGURES 4 and 5. The interior 20 of the post is solid and tapered at its ends at 21, as shown in FIGURE 4, similarly at both ends (FIGURE 3). The longitudinal extent of the post is provided alternately with fillets and grooves. Referring to FIGURE 5, a pair of fillets 22 and 23 have a relatively square groove 24 therebetween. Adjacent fillets 22 and 25 have an obtuse angled groove 26 in the nature of a fishtail in section. This particular fillet and groove configuration has proved very successful in giving the post considerable holding power when forced into an aperture smaller than the inscribing figure about the fillets. The fillets do not shear in use, but bend as shown because of their particular shape. Ordinarily, the fillets are formed so that a circle may inscribe them and a circular or near circular aperture of slightly smaller size may be used to receive the post. A bore through the post may be tolerated so long as it does not lessen materially the support of the fillets or collapse.

In the upper part of FIGURE 5, fillets such as 28 and 29 are shown as depressed by the opening 30 in the bulkhead 6, the movement being toward each other into the square groove between adjacent fillets. The material of the post is resilient and the fillets inherently urged outwardly against the aperture walls. As shown in FIGURE 4, the portions 31 of the fillets immediately beyond the aperture in the base 6, extend outwardly toward their original shape, forming a ledge, locking the post to the apertured base.

The strap is connected to the post integrally since the post and strap are a one-piece molded item. The strap connects directly to a collar 35 having a width greater than that of a strap portion 17 and having an interior web 36 extending from the collar to the post. In this manner the flutes on the posts extend beyond the peripheral edges 37 and 38 on the collar 35. Thus, the resiliency of the fillets urging outwardly against the base is not impaired by the connection of the strap to the post.

It is preferred that the apertures in the strap be of such a nature as to retain their shape and size even though forced over one end or the other of the post. To insure such action, a collar member 40 surrounds the aperture 12 and reenforces it against enlarging distention. A similar collar member 41 extends about the aperture 13. As best seen in FIGURE 4, the collar 41 maintains the aperture 13 in its original size when forced over the fillets of the post portion. The flutes 42 on the post portion impaling the aperture 13 are of the same nature as those shown in FIGURE 5 for the opposite post portion. Here also, the resiliency of the fillets forms a ledge 43 extending outwardly just beyond the collar to maintain the straps in a looped position as shown in FIGURE 3. Either aperture may be placed on the post as desired.

In the use of the present retainer, a hollow tool, is provided to loosely embrace one of the base portions and bear agianst the central collar 35. A push on this tool will insert the opposite post portion into the aperture in a sheet metal base. Thereafter, a wire such as 7 is manually placed against the strap 10 and the strap looped to bring one of its apertures into alignment with the opposite post portion. The same tool may be used to force the reenforced opening over the exposed post. Since the post portions on either side of the strap are in alignment and the material is solid, the attachment of the retainer to the base gives the strap very good support during the operation of forming the retaining loop.

The foregoing detailed description has been given for clearness of understanding only, and no unnecessary limitations should be understood thereof, for some modifications will be obvious to those skilled in the art.

I claim:

1. A one-piece plastic flexible retainer for supporting wires and the like relative to an apertured base, comprising: a solid post having longitudinally extending outer surface fillets, a bendable strap portion extending laterally of the post intermediate its ends and having an opening therein of a size to be impaled tightly on the post when the strap is looped to bring the opening into alignment with one end of the post, said strap, post and strap opening being constructed and arranged to permit the free end of the strap when impaled on said one end of the post to be positioned in face-to-face contact with the strap portion extending from said post, the opposite end of the post being free to extend into a base aperture to position the strap connection to the post against the base about the aperture, said fillets being resiliently bendable to frictionally bind the post to said apertured base and retain said strap in said looped shape, said ends of the post being the same for receiving the strap and for extending into said aperture.

2. A one-piece molded resilient plastic strap retainer for supporting and retaining wires and the like relative to an apertured base, comprising: a solid post tapered at opposite ends and having a plurality of outstanding longitudinally extending fillets and intervening grooves; an elongated strap extending laterally from the post intermediate its ends and having an opening therein spaced from the post and of a size to fit over said post but smaller than a figure inscribing said fillets, the portions of said post on either side of said strap having the same size fillets and grooves permitting either end of the post to be inserted in said apertured base, integral reinforcing material carried by said strap about said opening bracing said opening against enlarging distortion, said fillets being bendable to pass the post portion on one side of the strap at least partially through an opening in the base to secure the post to the base with the strap positioned against the base about the aperture, the fillets on the opposite ends of said post being bendable to receive said reinforced opening in the strap looped to bring the strap opening over the post with the free end of the strap positioned against the strap portion extending from said post whereby the strap connections to the post are immediately opposite the post connection to the apertured base.

References Cited in the file of this patent
UNITED STATES PATENTS

| | | |
|---|---|---|
| 1,310,119 | Harper | July 15, 1919 |
| 2,445,481 | Ge Wertz | July 20, 1948 |
| 2,759,390 | Edwards | Aug. 21, 1956 |
| 2,820,209 | Whitted | Jan. 14, 1958 |
| 2,896,889 | Hershberger et al. | July 28, 1959 |